United States Patent Office 3,157,690
Patented Nov. 17, 1964

3,157,690
PROCESS FOR SPLITTING OFF NITRIC ACID FROM ORGANIC NITRATE COMPOUNDS
Walter Fink, Zurich, Switzerland, assignor to Monsanto Company, a corporation of Delaware
No Drawing. Filed June 16, 1961, Ser. No. 117,515
Claims priority, application Switzerland July 18, 1960
7 Claims. (Cl. 260—465.7)

It was found that nitric acid can be split off from compounds which possess a nitrate group in the β-position with respect to an activating group and which have at least one hydrogen atom on the α-carbon atom, by the action of certain salts of hydrogen fluoride, especially potassium fluoride. Thus, the compounds which are suitable for the denitratization correspond to the following general formula

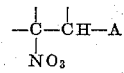

wherein A is a known activating group, especially an olefin, cyano or carbonyl group. Such compounds are β-nitrato-olefins, -nitriles, -aldehydes, -ketones, -carboxylic acids and their derivatives such as esters, amides, halogenides, and anhydrides, also thiocarboxylic acids and their derivatives. The valencies not yet occupied in the formula can be filled optionally, as far as these substituents do not hinder the exchange of the nitrate radical for the fluorine atoms. Instead of nitrate groups other groups such as nitrate and sulfate groups can be split off by the process of the invention.

The splitting off of nitric acid occurs with the formation of a double bond between the α and β-carbon atom according to the following scheme

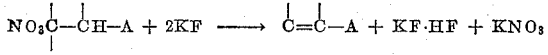

If in the starting material of the above formula, the nitrate radical were replaced by the nitrite or sulfate radical, nitrous or sulfuric acid are split off in a similar manner. Certain organic nitrate compounds which serve as starting material can be prepared in usual manner by the esterification of β-hydroxyl compounds. A much greater choice can be obtained by the addition of chloronitrate to α, β-unsaturated compounds which contain an activating group.

This process is described in copending application Serial No. 62,881, filed October 17, 1960. These compounds are valuable for carrying out the present process of invention. They contain on the α-carbon atom, apart from a hydrogen atom which is indispensable for the reaction, always a chlorine atom. This chlorine atom is maintained on the denitratization and unsaturated halogen containing end products are formed corresponding to the type

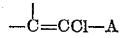

or to

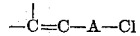

when the activating group is an olefin group as likewise on splitting off nitric acid from

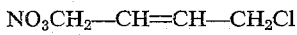

The latter compound is obtainable by the addition of chloronitrate to 1,3-butadiene.

For carrying out the reaction, the defined starting products which contain in the β-position a nitrate group are brought into an intimate contact with an at least double molar amount of a hydrogen fluoride salt, being preferably finely divided potassium fluoride. The amount of potassium fluoride is hereby based on the present nitrate groups. When, for example two nitrate groups are to be split off, an at least fourfold molar amount of potassium fluoride is necessary according to the theory. In general, an excess of potassium fluoride or of other fluoride will be used. It is supposed that the reaction occurs in two steps. With, for example, 1-chloro-2-nitratopropionitrile as follows:

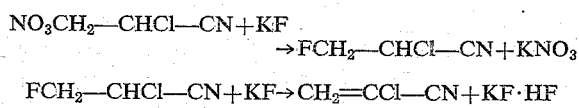

In the first reaction step, the exchange of the nitrate group for fluorine occurs. In the second reaction step, hydrogen fluoride is surprisingly easily split off, due to the catalytic activity of potassium fluoride. The hydrogen fluoride being set free is bound by the potassium fluoride and can be removed from the reaction mixture together with it. The denitratization by the new method can be carried out with or without the use of a solvent. But, the splitting off of nitric acid from 1-chloro-2-nitrato-compounds is generally done in a solvent, in order to avoid any decomposition of the unstable nitrate compounds which are generally prepared by using a solvent.

Suitable solvents are $CCl_4$, $CCl_3F$, $CCl_3H$ etc. The reaction temperature conforms to the instability of the nitrate containing starting products. Conveniently it is between about 20–40° C. The reaction time normally is about 4–6 hours, but in particular cases it may be essentially shorter. Corrosion-proof vessels manufactured from V2A, V4A, Hastelloy, graphite, quartz, ceramic etc. are used in the process.

For the isolation of the unsaturated reaction products the excess potassium fluoride together with the $KF \cdot HF$ and $KNO_3$ which are formed in the reaction, is filtered off. This method is recommended with compounds which are unstable and easily oxidized such as unsaturated aldehydes. The reaction product can also be fractionally distilled, if need for, under reduced pressure without a previous filtration.

If desired, anti-oxidants may be added to the reaction mixture. The use of a particular polymerization inhibitor is not necessary in the process of invention, because the salts which are present in the reaction mixture are very efficient in this respect. Among the different fluorides such as KF, NaF, $K_2TiF_6$, $AlF_3$, $ZnF_2$ etc. which have been examined until now, only zinc fluoride, besides potassium fluoride, has been found to be slightly active for the denitratization of β-nitrato-olefin compounds, β-nitrato-carbonyl compounds, β-nitrato-cyano compounds etc.

Now, it has yet been demonstrated for the first time that nitric acid can be split off from certain β-nitrato compounds by potassium fluoride at low temperatures, it is clear that possibly other appropriate fluorine salts may be found. But it seems that KF is the cheapest and most convenient substance for this purpose.

EXAMPLE 1

25.6 g. of $NO_3CH_2$—CHCl—$COOC_2H_5$ (0.13 mole) in 50 ml. of $CCl_3F$ are strongly stirred with 20 g. of KF (0.34 mole) at 25° C. for 5 hours. Then, the reaction mixture is fractionally distilled.
Yield: 8.5 g. (=48%) $CH_2$=CCl—$COOC_2H_5$; B.P. 41–43° C./15–16 mm.

EXAMPLES 2–4

It is proceeded as indicated in Example 1. The results are shown in the following Table 1.

Table 1

| Ex. | Denitratization of α-chloro-β-nitrato compounds ||| Boiling Point, °C./mm. Hg | Yield, percent |
|---|---|---|---|---|
| | β-Nitrato Compound | Product | | |
| 1 | $NO_3CH_2CHClCOOC_2H_5$ | $CH_2=CClCOOC_2H_5$ | 41–43/15–16 | 39–48 |
| 2 | $NO_3CH_2CHClCOCH_3$ | $CH_2=CClCOCH_3$ | 28–32/11 | 15 |
| 3 | $NO_3CH_2CHClCOOH$ | $CH_2=CClCOOH$ | 178–179/722 | 53 |
| 4 | $NO_3CH_2CHClCHO$ | $CH_2=CClCHO$ | | 10 |

Such compounds as, β-nitratopropionitrile, α-chloro-β-nitratopropionitrile, β-nitratopropionamide, β-nitratopropionyl chloride, β-chloro-β'-nitrato-succinic anhydride, α-chloro-β-nitrato-thiolpropionic acid and the like, if substituted in place of ethyl α-chloro-β-nitratopropionate in an equimolar quantity in the experiment of Example 1 would produce the corresponding olefin. Of the esters and ketones especially desirable reactants are those in which the A group is a —COOR or —COR group wherein R is an aliphatic, preferably alkyl, hydrocarbon radical having not more than 6 carbon atoms.

Although the invention has been described in terms of specified embodiments which are set forth in considerable detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What I claim is:

1. A process for splitting off nitric acid from compounds of the formula

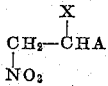

wherein A is selected from the class consisting of COOH, CN, CHO, and COR and COOR radicals wherein R is aliphatic hydrocarbon having from 1 to 6 carbon atoms, and X is the chlorine atom, comprising treating the nitrate compounds at a temperature in the range of about 20°–40° C., with at least double the stoichiometric amount of potassium fluoride based on the amount of nitric acid to be split off.

2. A process of claim 1 wherein the reaction is carried out in the presence of an inert solvent.

3. A process of claim 2 wherein A is a —COOR group and R is aliphatic hydrocarbon having from 1 to 6 carbon atoms.

4. A process of claim 2 wherein A is a —COR group and R is aliphatic hydrocarbon having from 1 to 6 carbon atoms.

5. A process of claim 2 wherein A is the aldehyde group.

6. A process of claim 2 wherein A is the cyano group.

7. A process of claim 2 wherein A is the carboxyl group.

No references cited.